United States Patent
Gulland

(10) Patent No.: US 7,552,238 B2
(45) Date of Patent: Jun. 23, 2009

(54) METHOD AND APPARATUS FOR MAINTAINING NETWORK DEVICE CONFIGURATIONS

(75) Inventor: Scott Gulland, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 813 days.

(21) Appl. No.: 10/955,268

(22) Filed: Sep. 30, 2004

(65) Prior Publication Data

US 2006/0085526 A1  Apr. 20, 2006

(51) Int. Cl.
*G06F 15/16* (2006.01)
*G06F 15/177* (2006.01)

(52) U.S. Cl. .......................... 709/248; 709/220; 709/221

(58) Field of Classification Search ................. 709/223, 709/224, 225, 220, 221, 248
See application file for complete search history.

(56) References Cited

U.S. PATENT DOCUMENTS

| | | | | |
|---|---|---|---|---|
| 5,864,679 A | * | 1/1999 | Kanai et al. | 709/238 |
| 5,884,325 A | * | 3/1999 | Bauer et al. | 707/201 |
| 5,924,096 A | * | 7/1999 | Draper et al. | 707/10 |
| 6,243,382 B1 | * | 6/2001 | O'Neill et al. | 370/395.52 |
| 6,330,618 B1 | * | 12/2001 | Hawkins et al. | 709/248 |
| 6,584,499 B1 | * | 6/2003 | Jantz et al. | 709/220 |
| 6,671,700 B1 | * | 12/2003 | Creemer et al. | 707/201 |
| 6,769,022 B1 | * | 7/2004 | DeKoning et al. | 709/223 |
| 6,810,405 B1 | * | 10/2004 | LaRue et al. | 707/201 |
| 6,868,451 B1 | * | 3/2005 | Peacock | 709/231 |
| 7,280,996 B2 | * | 10/2007 | Hayakawa et al. | 707/1 |
| 2002/0184300 A1 | * | 12/2002 | Schmeling et al. | 709/202 |
| 2003/0005097 A1 | * | 1/2003 | Barnard et al. | 709/223 |
| 2003/0149756 A1 | * | 8/2003 | Grieve et al. | 709/223 |
| 2004/0172423 A1 | * | 9/2004 | Kaasten et al. | 707/201 |
| 2004/0172469 A1 | * | 9/2004 | Takahashi et al. | 709/224 |

FOREIGN PATENT DOCUMENTS

EP  1331760 A1 * 7/2003

* cited by examiner

*Primary Examiner*—William C Vaughn, Jr.
*Assistant Examiner*—Kristie D Shingles

(57) ABSTRACT

A method for maintaining the configuration of a network device in a user device of a network includes updating a network management device each time the configuration of any of the network device changes, and notifying a plurality of user devices in the network each time the network management device is updated. A determination is made as to whether a select user device has been notified of a select update in the network management device of a configuration change of a select network device. The select user device is synchronized with the network management device to update the select user device with the configuration change in the select network device, if the select user device has been notified of the select update in the network management device.

12 Claims, 3 Drawing Sheets

FIG. 1
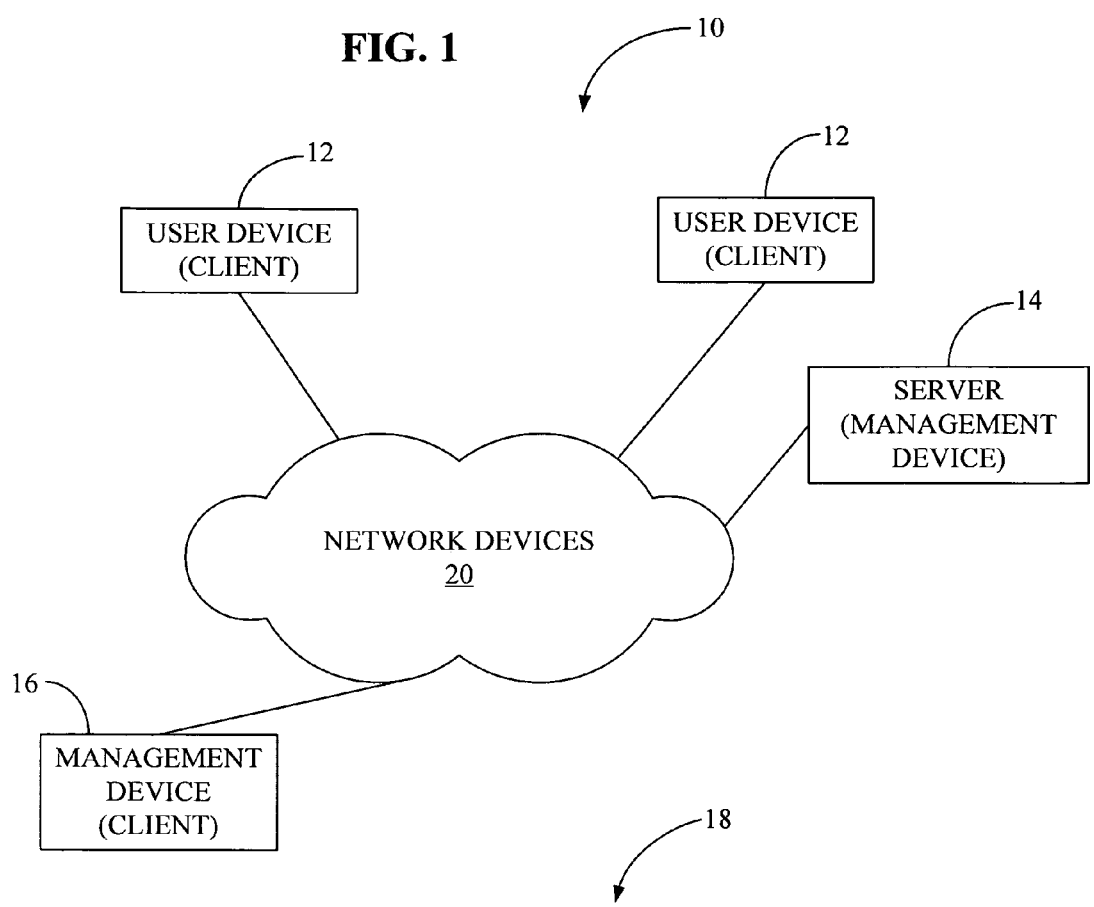
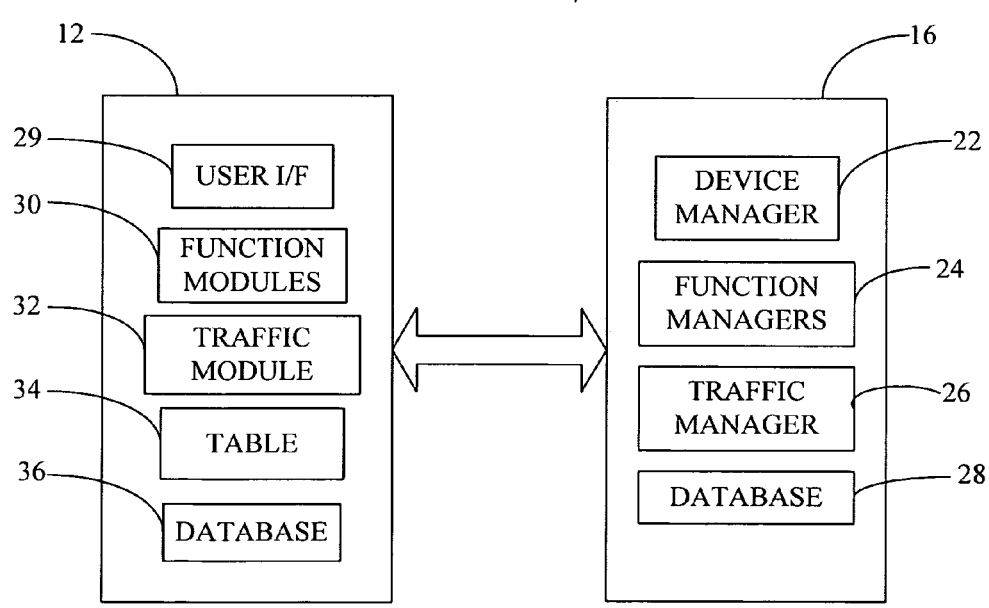
FIG. 2

METHOD AND APPARATUS FOR MAINTAINING NETWORK DEVICE CONFIGURATIONS

FIELD OF INVENTION

The present invention relates to management of network devices, and in particular, to management of dynamic changes in the configurations of network devices.

BACKGROUND OF THE INVENTION

Network management devices allow a user to manage network devices such as switches, routers and hubs. Typically, a management device searches the network for network devices when it is installed. As each network device is discovered, the management device (which may be a server) reads information from the network devices concerning their hardware configuration, network connectivity and software configuration, and stores this information into a management database.

Traffic data management is an example of a function in some network management devices that allows a user to collect traffic data from the ports of network devices. To conduct traffic data collection, the user selects one or more network devices he is interested in from the list of network devices that the management device has discovered. A list of ports for each device, their attributes (port type, speed, duplex mode, etc.) and traffic data collection capabilities are retrieved from the management device database. Based on this information, the user device (or client), displays the list of devices and their traffic capable ports to the user for him to configure. That is, the user selects which ports to collect data from and the type of data to collect.

Network switches have chassis that have many slots that accept blades containing physical ports. These switches are dynamically reconfigurable in that the user can add, remove, or swap a blade (thereby changing the type and the number of ports) on the fly in a running switch. When this occurs, the network management device database becomes out-of-sync with the current hardware configuration of the switch. If a user then tries to configure traffic management for this switch, he would be presented with incorrect information about its ports.

SUMMARY OF THE INVENTION

The present invention is directed to a method for maintaining the configuration of a network device in a user device of a network. The method includes updating a network management device each time the configuration of any of the network device changes, and notifying a plurality of user devices in the network each time the network management device is updated. A determination is made as to whether a select user device has been notified of a select update in the network management device of a configuration change of a select network device. The select user device is synchronized with the network management device to update the select user device of the configuration change in the select network device, if the select user device has been notified of the select update in the network management device.

BRIEF DESCRIPTION OF THE DRAWINGS

FIG. 1 is a diagram of a network environment in which the present invention may be implemented;

FIG. 2 is a block diagram of a network manager in accordance with one embodiment of the present invention;

DETAILED DESCRIPTION OF THE INVENTION

Figure 3:
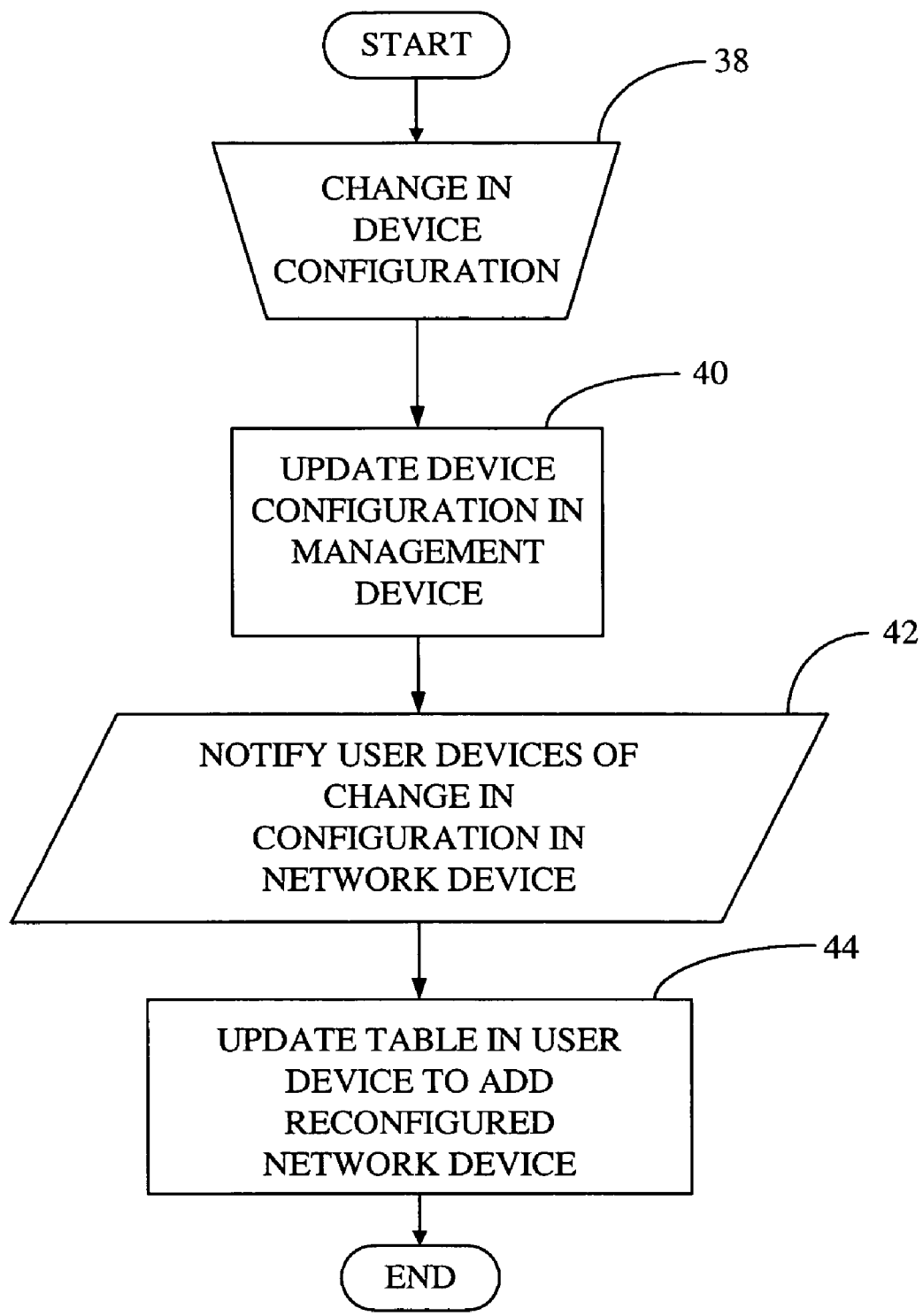
FIG. 3 is a flowchart illustrating the manner in which a user device is notified of a change in a network device configuration; and, FIG. 4 is a flowchart illustrating the manner in which a user device is synchronized with a management device to obtain a configuration update of a select network device according to one embodiment.

Broadly stated, the present invention is directed to apparatus and methods for maintaining network device configurations in the user devices in the network. In one embodiment, a network management device, which is in communication with the network devices, notifies all the user devices any time a network device changes configuration. No action need be taken by the user devices until a user device requires an access to a particular network device. At this time, the user device determines whether it has received a notification regarding a change in the configuration of the particular network device from the network management device. If a notification has been received, the user device is updated to obtain the changed configuration of the network device. If not, instructions to the network device are provided based on the last known configuration of that network device. In this manner, only the user device that requires an access to the network device with the changed configuration is updated, and not every user device in the network.

Turning now to FIG. 1, a network 10 in which the present invention may be implemented includes a number of user devices 12 (two shown), and at least one network management device 16 for controlling various management functions of the network devices. The user devices 12 and the management device 16 combine to define a network manager 18 in accordance with one embodiment of the present invention. The user devices 12 and the management device 16 are connected to a plurality of network devices 20 (shown collectively) such as switches, routers and hubs, that interconnect with each other to define the network 10 such as a LAN, a WAN or the Internet.

The user devices 12, which function as clients for the services provided by the network management device 16, may be any computing devices such as personal computers or workstations that communicate with the management device through the network devices 20. The network management client functionality may run in separate user devices 12 or can optionally run on the management device 16. The management device 16 maintains the health of the network 10, making sure that all network devices 20 are running properly and replacing devices that fail. In the present invention, the management device 16 may be a separate stand alone device dedicated for performing various management functions or incorporated into an existing server 14 as a software module. FIG. 1 shows the management device 16 as a stand alone device, and alternatively, being incorporated in the server 14.

Turning now to FIG. 2, the network manager 18 in accordance with one embodiment includes the user devices 12 (one shown) and the management device 16 which communicates with the user devices (clients) through the network devices 20. The management device 16 includes a device manager 22 for identifying the network devices 20 in the network 10, collecting the physical attributes about the devices and determining how these devices are inter-connected. A number of function managers 24 for performing various network management functions such as, for example, a traffic manager 26.

The function of the traffic manager 26 might include measuring the traffic data patterns in the network 10 to determine when particular segments in the network are overloaded, where in the network the overload is occurring, the type of data traffic causing the overload, and who/what are the primary generators of the traffic. A database 28 stores data which is used by the function managers 24, including configurations of the user devices 12.

The user devices 12 may be connected to the management device 16 via the network devices 20 such as switches, and include a user interface 29 for enabling a user to interact with the user device 12. A number of function modules 30 corresponding to and in cooperation with the function managers 24 in the management device 16 enable the user to perform various desired functions or tasks. For example, a traffic module 32, in cooperation with the traffic manager 26, enables traffic data collection. A table 34 stores a list of network devices 20 which have undergone changes in configurations since the last time the user device 12 was synchronized with the management device 16. The table 34 is in the form of a data structure used in the field of software engineering. A database 36 is used for storing persistent information about the network devices 20 found in the network 10, detailed information about the hardware and software configuration of each network device found, and configuration information used in management functions such as traffic data management and VLAN management, for example. When the user device 12 is synchronized, the database 36 of the user device 12 is updated to correspond with the database 28 of the management device 16.

Turning now to FIG. 3, the present invention is adapted to be operated whenever there is a physical, or hardware, change in the network devices 20 (block 38) such as, for example, when a new blade is inserted or removed in a switch that would cause the device configuration to change. When a change occurs, the database 28 in the management device 16 is updated or resynchronized to reflect the change in the network device configuration (block 40). One manner of updating the device configuration in the management device 16 is to have a user manually select the affected network device 20 and rescan (i.e., communicate with the network device and request information about its configuration) the updated device configuration in the management device. Another option is to have the network device 20 automatically send a data packet across the network 10 to the management device 16, informing it of the change in the configuration. The management device 16 then automatically performs a configuration update operation for the network device 20 sending the packet.

Once the device configuration has been updated, the management device 16 notifies all the user devices 12 of the configuration change in the network device 20 (block 42). It should be understood that the user devices 12 are notified that there has been an occurrence of a change in configuration in a particular network device 20, and not necessarily the particulars of that change. Accordingly, the notification would include at least the identification of the network device 20. When the user devices 12 receive this notification, the table 34 in each user device is updated to indicate that there has been a change in the particular network device (block 44). In other words, the reconfigured network device 20 is added to the table 34. If the network device 20 is already listed in the table 34, it is not added to the table again. In the event a user device 16 is powered off at the time the management device 16 issues a notification, the user device is automatically resynchronized by having its database 36 reloaded with information from the database 28 of the management device 16 when the user device comes back on line.

Figure 4:
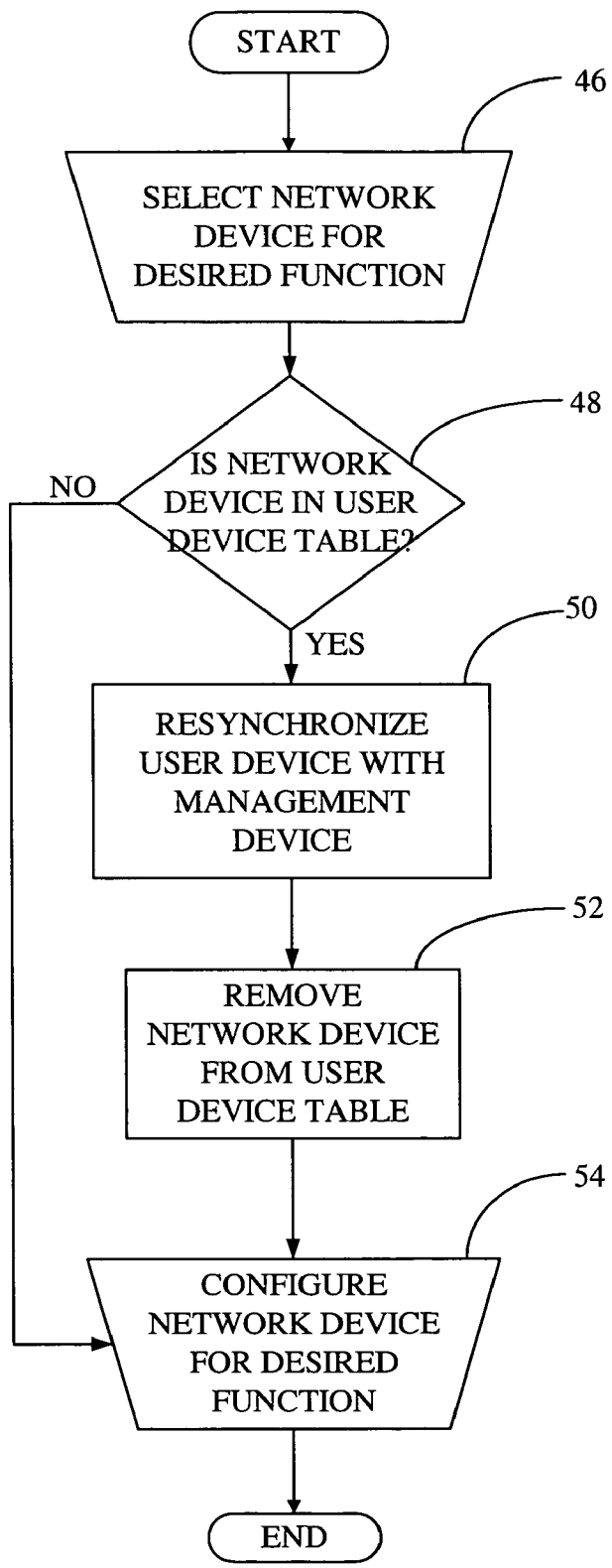

Referring now to FIG. 4, when a user decides to access a function module 30 for performing a desired task, for example, traffic management data collection, the user selects the network device 20 of interest through the user interface 28 in one of the user devices 12 (block 46). In response, the user device 12 checks to see if the selected network device 20 exists in its table 34 (block 48).

If the selected network device 20 is not listed in the table 34 of user device 12, the selected network device is configured for the desired task (block 54). More specifically, the list of ports for the selected network device 20, its attributes (port type, speed, duplex mode, etc.) and the function capabilities (e.g., the traffic management data collection capabilities) which have been previously stored are accurate and are thus retrieved from the database 36 of the user device 12. Based on this information, the user configures the selected network device 20 for the desired function. That is, the user selects which ports to collect data from and the type of data to collect.

On the other hand, if the selected network device 20 is listed in the table 34 of the user device 12 selected by the user, the user device is resynchronized with the management device 16 (block 50). This involves updating the database 36 of the user device 12 with the database 28 of the management device 16, so that the updated configuration of the selected network device 20 previously stored in the database 28 of the management device (as described above) is available in the database of the user device. Once the database 36 of the user device 12 has been resynchronized with the database of the management device 16, the entry for the selected network device 20 is removed from the table 34 (block 52). In this manner, the user device 12 does not resynchronize with the management device 16 the next time the network device 20 is referenced by the user for another task, since the user device has already been updated with the network device's latest configuration change. Once the user device 12 has been resynchronized and the network device entry removed form the table 34, the selected network device 20 is configured by the user for the desired function, for example, traffic management data collection (block 54).

As described above with respect to FIG. 3, if there had been a change in the configuration in any of the network devices 20, all or a predetermined number of user devices 12 would have been notified of this change. Each user device 12 would then have listed the affected network device in its table 34. In the process described above with respect to FIG. 4 for configuring a network device 20 to perform a particular task, only the user device selected by the user is affected. In other words, the process described above for resynchronizing with the management device 16 (block 50) and the process for removing the affected network device 20 from the table (block 52) are with respect to the particular user device being used by the user. The other user devices 12 are not affected. It may be that these other user devices 12 need not be resynchronized and their respective tables 34 not altered at all, if they do not have to access the network device 20 with the changed configuration. In this manner, not all user devices 12 are resynchronized each time a network device 20 undergoes a configuration change, thereby avoiding unacceptable management device performance.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A computer-implemented method for maintaining configurations of network devices in user devices of a network, said method comprising:

updating a database in a network management device each time a configuration of any of network devices in the network changes, said network management device database being updated by a network device whose configuration has changed or by a user of the network management device;

said network management device notifying the user devices in the network each time the network management device is updated, storing the notifications of the updated of the network management device in a table maintained in each of the user devices if a prior notification relating to the same network device has not been stored in the table, wherein the table stores a list of network devices that have undergone configuration changes;

determining whether a select user device has been notified of an update in the network management device of a configuration change of a network device selected by the select user device, wherein the configuration of the selected network device is determined to have been changed if a notification indicating the configuration change of the selected network device is stored in the table of the select user device;

communicatively establishing a connection between the select user device and the selected network device without synchronizing the select user device with the network management device if the select user device has not been notified of the update in network management device of a configuration change in the selected network device;

synchronizing the select user device with the network management device to update the select user device of the configuration change in the selected network device prior to communicatively establishing a connection between the select user device and the selected network device, if the select user device has been notified of the update in the network management device of a configuration change in the selected network device; and updating a database in the select user device to correspond with the database in the network management device, when the select user device synchronizes with the network management device.

2. The method as defined in claim 1, further comprising deleting the notification indicating the change in the configuration of the selected network device from the table of the select user device after the select user device has been synchronized with the network management device.

3. The method as defined in claim 2, further comprising configuring the selected network device to perform a desired function requested by the select user device after the select user device has been synchronized with the network management device.

4. The method as defined in claim 1, wherein said notifying of the user devices each time the network management device is updated comprises the network management device sending a signal to the user devices identifying the network device that has a changed configuration.

5. A system with a processor for maintaining configurations of select network devices in a plurality of user devices of a network, comprising:

a network management device in communication with network devices for synchronizing with any of the network devices which includes updating a database in said network management device each time a configuration of any of the network devices in the network changes, wherein said database stores the configurations of any of the network devices with which said network management device synchronizes;

said network management device notifying the user devices in the network each time the network management device is synchronized, wherein said network management device is synchronized by a network device whose configuration has changed or by a user of the network management device;

a select user device in communication with said network management device maintaining a table for storing the notifications from said network management device indicating the synchronization of said network management device with any of the network devices having configuration changes, if a prior notification relating to the same network device has not been stored in the table;

said select user device determining whether the table in said select user device contains a notification of a synchronization in said network management device as a result of a configuration change in a network device selected by said select user device; wherein the configuration of the selected network device is determined to have been changed if a notification indicating the synchronization of the selected network device is stored in the table of the select user device;

said select user device communicatively establishing a connection between said select user device and said selected network device without synchronizing said select user device with said network management device, if said select user device has not been notified that said network management device has been synchronized with said selected network device;

said select user device synchronizing with said network management device to obtain the changes in the configuration of said selected network device prior to communicatively establishing a connection between said select user device and said selected network device, if a notification sent by said network management device indicating the synchronization between said network management device and said select network device is stored in the table of said select user device; and said select user device updating a database in said select user device to correspond with the database in the network management device, when the select user device synchronizes with the network management device.

6. The system as defined in claim 5, wherein said notification relating to the selected network device is deleted from said table after said select user is synchronized with said network management device.

7. The system as defined in claim 5, wherein said select user device configures the selected network device to perform a user desired function based on the configuration of the selected network device stored in said database of said select user device.

8. The system as defined in claim 5, wherein said notifications include information identifying the network devices with which said network management device has synchronized.

9. The system as defined in claim 5, wherein said select user device is in communication with said network management device throughtout the network.

10. The system as defined in claim 5, wherein said network management device comprises a server.

11. The system as defined in claim 5, wherein said user devices comprise personal computers or workstations.

12. The system as defined in claim 5, wherein the network devices comprise at least switches, routers and hubs.

* * * * *

UNITED STATES PATENT AND TRADEMARK OFFICE
CERTIFICATE OF CORRECTION

| | | |
|---|---|---|
| PATENT NO. | : 7,552,238 B2 | Page 1 of 1 |
| APPLICATION NO. | : 10/955268 | |
| DATED | : June 23, 2009 | |
| INVENTOR(S) | : Scott Gulland | |

It is certified that error appears in the above-identified patent and that said Letters Patent is hereby corrected as shown below:

In column 5, line 12, in Claim 1, after "any of" insert -- the --.

In column 5, line 20, in Claim 1, delete "updated" and insert -- update --, therefor.

In column 5, line 38, in Claim 1, after "update in" insert -- the --.

In column 7, line 8, in Claim 9, delete "throughtout" insert -- through --, therefor.

Signed and Sealed this

Twenty-third Day of February, 2010

David J. Kappos
*Director of the United States Patent and Trademark Office*